United States Patent
Cooke et al.

(10) Patent No.: US 6,738,555 B1
(45) Date of Patent: May 18, 2004

(54) FURCATION KIT

(75) Inventors: Terry L. Cooke, Hickory, NC (US); Stuart R. Melton, Hickory, NC (US); Timothy S. Laws, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 244 days.

(21) Appl. No.: 09/819,838

(22) Filed: Mar. 28, 2001

(51) Int. Cl.7 ................................................ G02B 6/00
(52) U.S. Cl. ...................................................... 385/136
(58) Field of Search ................................ 385/135–137, 385/99–100, 101, 1, 106, 107; 439/99, 623; 174/91, 92, 93

(56) References Cited

U.S. PATENT DOCUMENTS

| | | | | |
|---|---|---|---|---|
| 4,047,797 A | * | 9/1977 | Arnold et al. ............... | 385/136 |
| 5,231,688 A | * | 7/1993 | Zimmer ....................... | 385/139 |
| 5,491,766 A | * | 2/1996 | Huynh et al. ................ | 385/100 |
| 5,528,718 A | * | 6/1996 | Ray et al. .................... | 385/136 |
| 5,970,195 A | * | 10/1999 | Brown ......................... | 385/100 |
| 6,061,492 A | * | 5/2000 | Strause et al. .............. | 385/135 |

\* cited by examiner

*Primary Examiner*—Jean F. Duverne

(57) ABSTRACT

A furcation kit utilizes the strength aramid fibers from the multiple fiber cable to form the mechanical connection between the cable and the furcation unit. This furcation kit has at least one and preferably two crimping surfaces where the strength fibers can be affixed. This furcation kit is usable with a variety of cables, including cables with two sets of strength fibers, cables with one set of strength fibers, and cables with an oval or a rectangular profile, among others. In accordance to one aspect, the furcation kit also allows the multiple fiber cable to be separated into single fibers or into smaller multiple fiber cables. In accordance to another aspect, the kit resists relative rotational movement between the housing of the kit and a fanout body contained therein. In accordance to another aspect, the furcation kit can be stacked or bundled with one another.

27 Claims, 4 Drawing Sheets

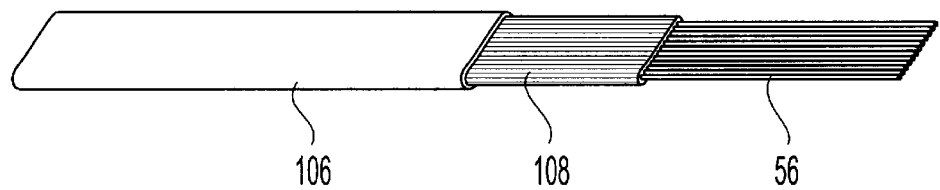
*Fig. 6*
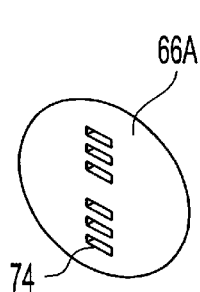 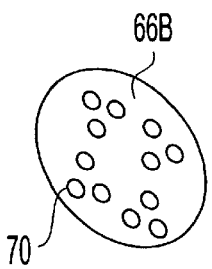 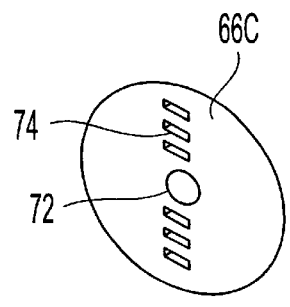 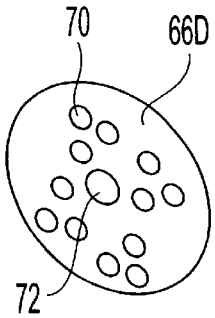
*Fig. 7a*   *Fig. 7b*   *Fig. 7c*   *Fig. 7d*
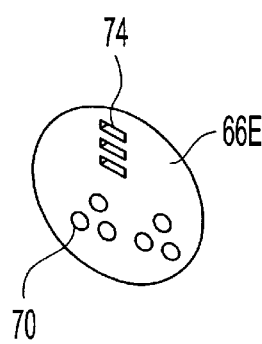 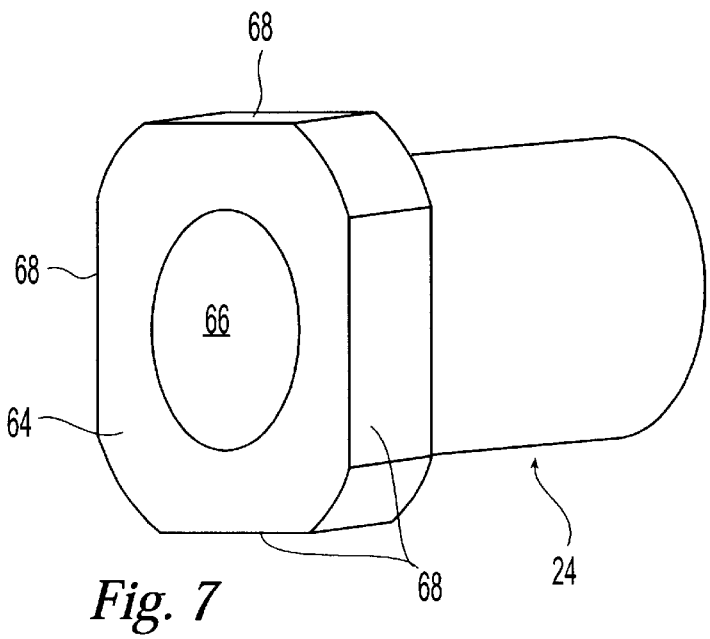
*Fig. 7e*   *Fig. 7*

FURCATION KIT

FIELD OF THE INVENTION

The present invention generally relates to optical fiber connectors, and more particularly to furcation kits for the breakout of multi-fiber optical fiber cables.

BACKGROUND OF THE INVENTION

It is necessary to divide multi-fiber optical cables from main or trunk lines into smaller cables to reach the end-users. Typically, multi-fiber cables are terminated with single fiber connectors that are then individually connected into optical hardware or apparatus. U.S. Pat. No. 5,231,688 to Zimmer discloses a furcation kit, which segregates a multi-fiber optical cable into single optical fibers. Each separated fiber is then inserted into an individual furcation tube or terminated leg for connection to a terminal connector. While the '688 patent provides a workable solution for furcating multi-fiber cables, the strain relief disclosed in this reference does not take advantage of the aramid strength fibers present in the cables. This reference also does not provide for stacking or bundling of the furcation kits to organize the connection inside the optical hardware or apparatus, and does not provide for the furcation of oval or rectangular profiled cables and ribbons.

U.S. Pat. No. 5,970,195 to Brown discloses another furcation kit, which comprises housing and a plurality of single loose furcation tubes positioned inside the kit housing. Each single loose furcation tube comprises an inner tube adapted to receive a bare optical fiber and an outer protective jacket disposed concentrically around the inner tube. Aramid strength fibers are provided in the annular space between the inner tube and the outer protective pocket. The fibers are dimensioned to protrude beyond the end of the protective jacket and are folded backward around the protective jacket to be captured within the housing of the furcation kit. The captured strength fibers are then affixed to the housing of the furcation kit with adhesives. The captured strength fibers disclosed in this reference protect the single loose tubes against being accidentally pulled out of the furcation kit, but does not provide any protection for the optical cable.

Hence, there remains a need for a furcation kit that overcomes these and other known drawbacks of conventional furcation kits.

SUMMARY OF THE INVENTION

Accordingly, it is an object of the present invention to provide a furcation kit that relieves the strain exerted on the furcation kit using the available strength fibers from the optical cables.

Another object of the invention is to provide a furcation kit capable of being stacked or bundled within the optical hardware or apparatus.

Another object of the present invention is to provide a furcation kit that does not require furcation tubes or terminated legs.

Another object of the present invention is to provide a furcation kit that resists relative rotational movement between the kit housing and an internal fanout body.

Another object of the present invention is to provide a furcation kit that terminates a multi-fiber cable into single fibers and multiple fibers.

These and other objects of the present invention are realized by a furcation device comprising, among other things, a housing member adapted to receive a fanout body. The fanout body comprises a plurality of passageways, and each passageway receives at least one individual fiber from the multiple fiber cable. The housing member may also have at one end a cable crimp body. At least some of the strength members from the multiple fiber cable are crimped between the cable crimp body and a first crimp band to affix the multiple fiber cable to the furcation device. The fanout body may also have an exterior fanout crimp surface, and at least some of the strength members from the multiple fiber cable are crimped between the fanout crimp surface and a second crimp band to affix the multiple fiber cable to the furcation device.

In accordance to one aspect of the invention, the strength members from the multiple fiber cable comprise outer strength members and inner strength members, which are disposed inside the outer strength members. Some of the outer strength members are crimped between the cable crimp body and the first crimp band, and some of the inner strength members are crimped between a fanout crimp surface and a second crimp band. On the other hand, some of the outer strength members can also crimped between the fanout crimp surface and the second crimp band, and some of the inner strength members can also be crimped between the cable crimp body and the first crimp band.

In accordance to another aspect of the invention, the plurality of passageways comprises at least one passageway adapted to receive one individual fiber and at least one passageway adapted to receive one multiple fiber cable.

In another aspect of the invention, the housing member further comprises a first and second interlocking member. The first interlocking member is adapted to interlock with the second interlocking member disposed on an adjacent furcation device. The first interlocking member can be a knob disposed on the surface of the housing member, and the second interlocking member is a hole adapted to receive the knob. The knob may be tapered and defines a slit to facilitate the entry of the knob into the hole. The knob and hole may be positioned on the top and bottom surfaces of the housing, respectively, or on opposite side surfaces.

In another aspect of the invention, the fanout body comprises at least one substantially flat surface thereon. This substantially flat surface cooperates with a corresponding substantially flat surface defined on the housing to resist relative rotational movement between the fanout body and the housing member.

BRIEF DESCRIPTION OF THE DRAWINGS

In the accompanying drawings which form a part of the specification and are to be read in conjunction therewith and in which like reference numerals are used to indicate like parts in the various views:

FIG. 6 is a perspective partial cut-away view of an optical ribbon with an oval or rectangular shape usable with the furcation kit in accordance to the present invention; and FIG. 7 is an enlarged view of the fanout crimp body; and FIGS. 7A–7E show some of the preferred embodiments of the fanout crimp body of FIG. 7.

DETAILED DESCRIPTION OF THE INVENTION

Figure 1:
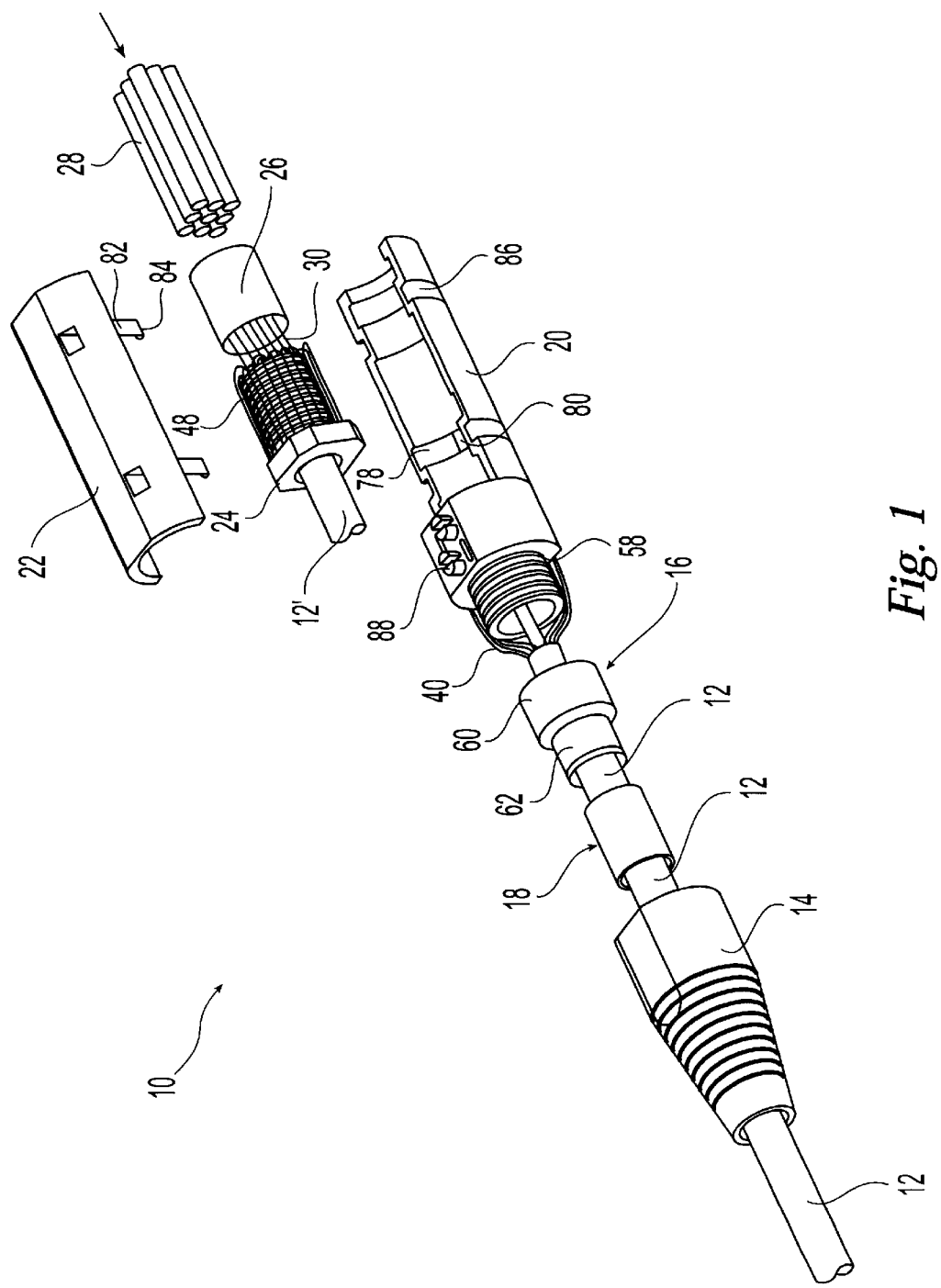
FIG. 1 is an exploded view of one embodiment of a preferred furcation kit in accordance to the present invention.
Figure 2:
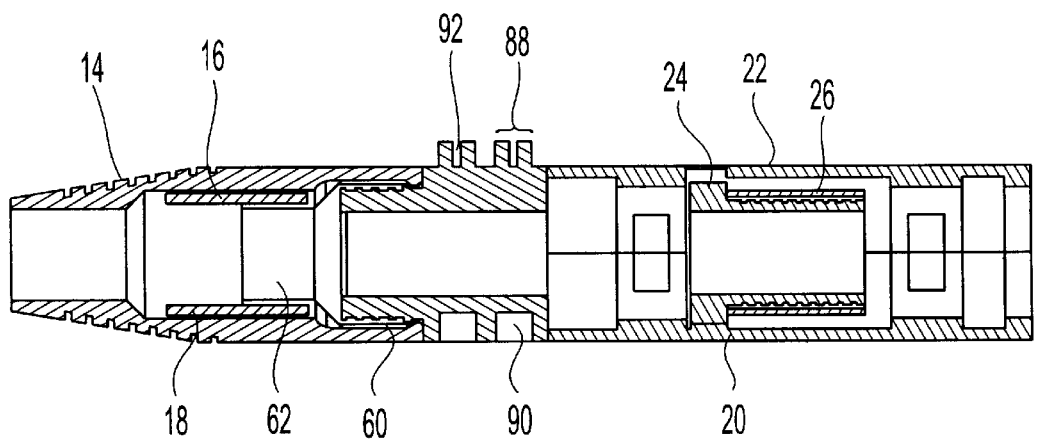
FIG. 2 is a cross sectional view of the assembled furcation kit shown in FIG. 1 without the optical cable for clarity purpose.

As shown generally in FIGS. 1 and 2 where like numbers designate like parts, reference number 10 broadly designates the furcation kit in accordance to the present invention. Furcation kit 10 is adapted to furcate an optical cable generically designated as 12 in FIG. 1. Many different types of optical cables can be used with furcation kit 10. Some of the examples of these cables are illustrated in FIGS. 3A, 3B, 4A, 4B, 5A, 5B and 6. Other optical cables can also be used with the present invention, and the present invention is not limited to the types of optical cables illustrated herein.

Furcation kit 10 comprises a segmented boot 14, a cable crimp band 16 and a heat shrinkable jacket 18 connecting the optical cable 12 to the furcation kit 10. Furcation kit 10 further comprises a housing member 20 and a removable top member 22. Housing member 20 and top member 22 cooperate to encapsulate a fanout crimp body 24 and a fanout crimp band 26, as best shown in FIG. 2. The bare optical fibers, generically designated as reference number 30 in FIG. 1, contained within optical cable 12 are separated within fanout crimp body 24, as discussed in detail below. A plurality of furcation tubes or terminated legs 28 may optionally be provided to conduct the segregated bare optical fibers 30 away from the furcation kit. As discussed below, the furcation kit in accordance to the present invention may be used without furcation tubes.

Figure 3A:
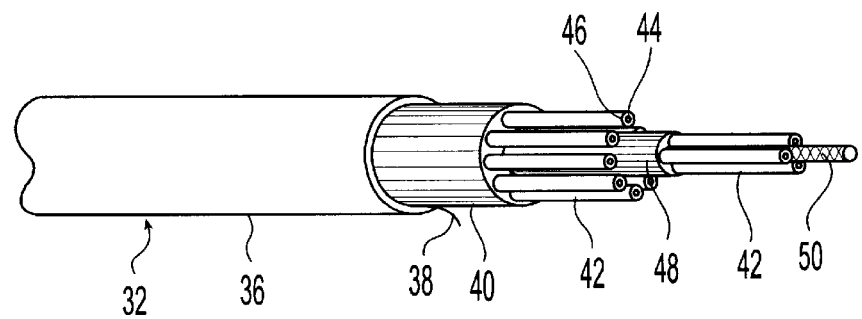
FIG. 3A is a perspective partial cut-away view of an optical cable usable with the furcation kit in accordance to the present invention with two sets of strength fibers.
Figure 3B:
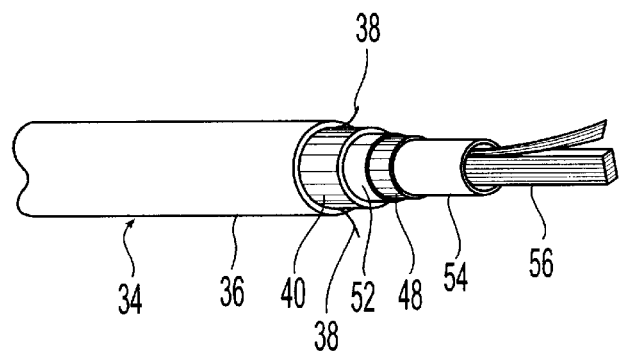
FIG. 3B is a perspective partial cut away view of another optical cable with two sets of strength fibers.

The optical cables 32 and 34, shown in FIGS. 3A and 3B, respectively, are two of the preferred optical cables usable with furcation kit 10. Each cable advantageously has two separate sets of strength fibers, which are preferably made from aramid yarns such as Kevlar™ fibers. Each cable has an outer jacket 36 covering and protecting the cable from environmental contaminations. Each cable also has one or more ripcords 38 disposed immediately below outer jacket 36. The ripcord facilitates the stripping of the outer jacket of the optical cables to prepare the cables for attachment to furcation kits or to connectors. Cables 32, 34 also have first set of outer strength fibers 40.

Cable 32, shown in FIG. 3A, also contains a plurality of buffered optical fibers 42. Each of the buffered optical fiber 42 generally comprises a bare fiber 44 disposed inside a protective acrylate buffer 46. Cable 32 also has second set of inner strength fibers 48, which are preferably disposed concentrically between the two rings of buffered optical fibers 42. Cable 32 further comprises an optional central member 50, which is preferably made from a dielectric material to provide an electrical ground for the cable 32.

Similarly, cable 34, shown in FIG. 3B, also contains second set of inner strength fibers 48 separated from outer strength fibers 40 by a protective layer 52. A buffer tube 54 is protected by inner strength fibers 48 and encloses a plurality of optical fiber ribbons 56.

To connect cables 32, 34 or another cable 12 to furcation kit 10, the cable is preferably inserted first through boot 14, jacket retention 18 and crimp band 16. The ripcord 38 is then pulled backward to strip away outer jacket 36 to expose the outer strength fibers 40. At least some of the outer strength fibers 40 are then trimmed and positioned on top of crimp body 58 of bottom housing 20, as best shown in FIG. 1, while the remaining core of the cable, generically designated as 12', is passed through the crimp body 58 to enter the interior of bottom housing 20. Outer strength fibers 40 are affixed to crimp body 58 by crimping end 60 of cable crimp band 16 over strength fibers 40 and crimp body 58. Preferably, the crimp body 48 has a plurality of exterior ridges and end 60 is made from a pliable metallic material. The crimping operation is known in the art, as shown for example in U.S. Pat. No. 5,806,175 to Underwood. The '175 patent is hereby incorporated by reference in its entirety.

Heat shrinkable jacket 18 is then disposed partially over end 62 of cable crimp band 16 and partially over a section of cable 12, and is then shrunk with heat to affix a section of cable 12 to cable crimp band 16. The segmented boot 14 is then coupled to (by friction fit, adhesives, etc.) cable crimp band 16 and a portion of housing member 20, covering jacket retention 18 and a portion of cable 12, as best shown in FIG. 2, to protect against environmental contamination and to control the bend radius of the cable 12.

As most clearly shown in FIG. 1, remaining core 12' enters the housing member 20 through the hole defined in the crimp body 58. Preferably at or prior to this juncture, optical fibers 44 of cable 32 or optical ribbons 56 of cable 34 are stripped away from their buffer tubes 46 and 54, respectively. Inner strength fibers 48 are folded over the ridged end of the fanout crimp body 24 and are positioned over the exterior ridges of the fanout crimp body. Fanout crimp band 26 is then placed over second strength fibers 48, and is crimped to secure the inner strength fibers 48 to the fanout crimp body to enhance the mechanical connection between the cable 12 and the furcation kit 10. Additionally, some of the outer strength members 40 may also enter inside housing member 20 and be crimped along with inner strength fibers 48 to the fanout crimp body 24. Alternatively, some of the inner strength members 48 may also be crimped along with the outer strength members 40 between crimp body 58 on housing member 20 and crimp ring 16.

With respect to cable 32, bare fibers 44 are then inserted into fanout crimp body 24, where each fiber is inserted into a furcation tube 28 to be conducted to a terminal connector or directly to an optical apparatus or hardware. The length of the furcation tubes may be of any appropriate length, but preferably range from 6 inches to 200 inches, and the diameter of the furcation tubes may be of any appropriate size, but preferably range from 900 microns to 3.0 mm. Furcation tubes 28 can be affixed to the fanout crimp body by known processes, such as those described in U.S. Pat. No. 5,231,688. FIG. 7 shows the fanout crimp body 24 (without exterior ridges for clarity) with receiving end 64 and end face 66 defined thereon. While receiving end 64 has four substantially straight edges 68 illustrated, at least one edge 68 must have a configuration that assists with the orientation of the fanout crimp body 24 within body member 20 and at least one edge 68 to resist relative movement between the fanout crimp body 24 and housing member 20.

End face 66 may have one of a number of profiles 66A–66E, shown in FIGS. 7A–7E respectively, depending on the configuration of the optical cable 12. Specifically, end face 66D defines a number of fiber holes 70, sized and dimensioned to receive bare fibers 44 from cable 32 and furcation tubes 28 are received at the opposite end face. End face 66D may also define a central hole 72 to receive dielectric central member 50. Alternatively, holes 70 can be sized and dimensioned to receive both buffer tubes 46 and fibers 44. Buffer tubes 46 may act as a protective sheath to shield and protect fibers 44 from bending when inserted through the fiber holes in the end faces 66A–66E, thereby rendering the use of furcation tubes unnecessary in this alternative embodiment.

End face 66A defines a number of slots 74 sized and dimensioned to receive the substantially flat optical ribbons 56 of cable 34. Furcation tubes 28 may also have a similar profile as the ribbons 56 to conduct the ribbons to terminal connectors or optical hardware. Alternatively, the fibers in ribbons 56 may also have individual, protective sheaths, thereby rendering the use of furcation tubes unnecessary.

After the fanout crimp ring 26 is crimped around the crimp body 24, this subassembly is placed in housing member 20, as illustrated in FIGS. 1 and 2. Preferably, housing 20 defines a channel 78 adapted to receive the receiving end 64 of the fanout crimp body 24. Channel 78 corresponds to the configuration of receiving end 64, which in the preferred embodiment has at least one substantial straight edge 80 to receive the straight edge 68 on receiving end 64. Straight edges 80 cooperate with straight edges 68 to resist relative rotational movement between housing member 20 and fanout crimp body 24. After the fanout crimp body and fanout crimp band subassembly is placed within the housing member 20, the top member 22 is snapped on to the housing member 20 to secure the subassembly therein. Top member 22, as shown in FIG. 1, has a number of legs 82 with a hook 84 disposed at the end of each leg 82. Each leg 82 is received in a groove 86 shaped to removably receive and securely retain leg 82 and hook 84. Alternatively, the top member 22 can be attached in an manner, including for example, through an interference fit, adhesive, tongue and groove, etc.

In accordance to another aspect of the invention, furcation kit 10 also has a stacking or bundling feature to allow the organization of multiple furcation kits within optical apparatus or hardware, such as the trays in the optical connection cabinets located within the distribution network described in U.S. Pat. No. 6,061,492. To this purpose, housing member 20 has number of knobs 88 disposed on the top of the housing member and a corresponding number of holes 90 disposed on the bottom of the housing. Preferably, knob 88 is tapered at the top end and has a slit 92 defined therein, and the outer diameter of the knob 88 is slightly larger than the inner diameter of the corresponding hole 90. When one furcation kit 10 is stacked to an adjacent kit, the tapered top end of knob 88 of one kit guides the knob into the hole 90 of the adjacent kit. The slit 92 allows the two halves to knob 88 to resiliently come together as the knob is inserted into hole 90. Due to the resiliency of the knob 88, it exerts a pressure on the wall of hole 90 to hold securely one furcation kit to another. This construction also allows the connected furcation kits 10 to be pulled apart when necessary. Also, knobs 88 and holes 90 may be positioned on the opposite sides of furcation kit 10, so that the furcation kits may be stacked side-by-side in addition to top-to-bottom.

Figure 4A:
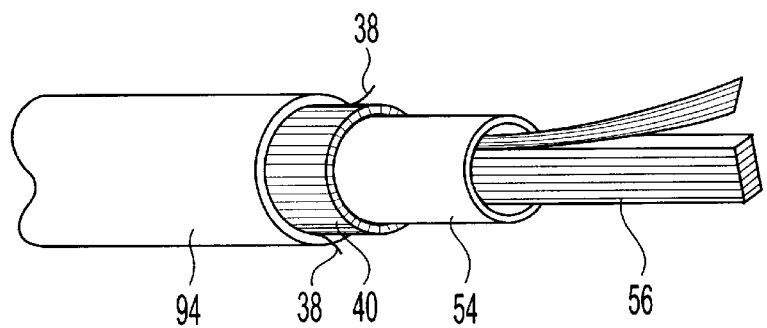
FIG. 4A is a perspective partial cut-away view of an optical cable usable with the furcation kit in accordance to the present invention with one set of strength fibers.
Figure 4B:
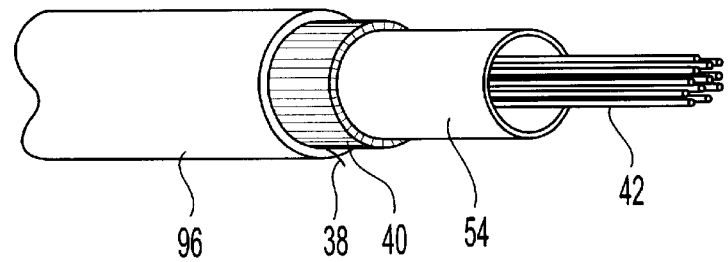
FIG. 4B is a perspective partial cut away view of another optical cable with one set of strength fibers.

In accordance to another aspect of the present invention, optical cables with only the outer strength fibers 40 are also usable with the furcation kit 10. As shown in FIGS. 4A and 4B, cables 94, 96 have outer strength members 40 protecting buffer tube 54, which surround a number of ribbons 56 or buffered fibers 42, respectively. In this scenario, some of the outer strength members 40 are crimped between cable crimp band 16 and crimp body 58 of housing member 20, as described above. The remaining strength members 40 then are passed through fanout crimp body 24 and are crimped between fanout crimp body 24 and fanout crimp ring 26.

Figure 5A:
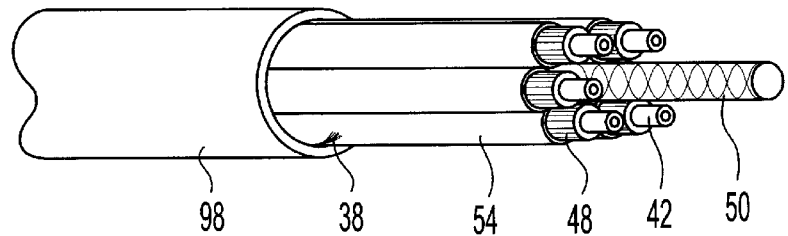
FIGS. 5A and 5B are perspective partial cut-away view of optical cables comprising loose tubes of fibers usable with the furcation kit in accordance to the present invention.

Furthermore, optical cables with individual sets of inner strength members 48, such as optical cable 98 shown in FIG. 5A, are also usable with furcation kit 10. Cable 98 has an outer jacket surrounding a plurality of buffered tubes 54. Each tube 54 surrounds a buffer fiber 42, which also contains inner strength members 48. Each buffer fiber may contain one or more bare optical fibers. In this situation, some of the inner strength members 48 are crimped between cable crimp band 16 and crimp body 58 of housing member 20, and the remaining strength members are crimped between fanout crimp body 24 and fanout crimp ring 26.

Figure 5B:
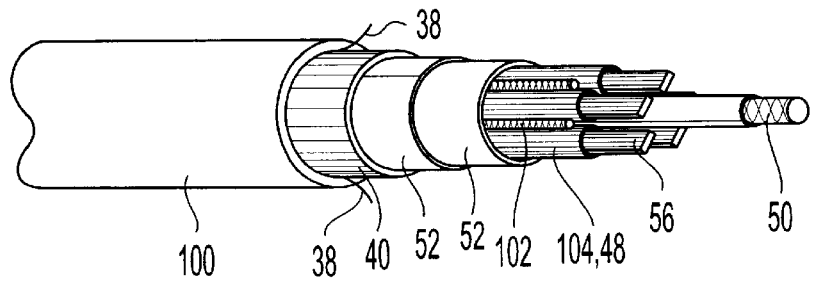

Additionally, optical cables with outer strength members 40 and individual sets of inner strength members 48, such as optical cable 100 shown in FIG. 5B, are also usable with furcation kit 10. Cable 100 has outer strength members 40 covering two separate protective layers 52,53. Layer 52 is typically a metal protective layer or a layer of water-swellable tape, and layer 53 is a core tube that surrounds dielectric rods 102 and a plurality of tubes 104 containing optical ribbons 56. Each of these tubes is preferably covered by inner strength members 48. In this situation, some of the outer strength members 40 are crimped between cable crimp band 16 and crimp body 58 of housing member 20, as described above. The remaining strength members 40 then are optionally passed through fanout crimp body 24 and are crimped between fanout crimp body 24 and fanout crimp ring 26, along with individual inner strength members 48. Alternatively, furcation kit 10 can be sized and dimensioned to be usable individually with each buffered tube 54 of cable 98 or with each tube 104 of cable 100.

Furcation kit 10 is also usable with substantially oval or rectangular profiled cables, such as ribbon cable 106 shown in FIG. 6. Ribbon cable 106 has an outer protective jacket 107 surrounding strength members 108, which protect optical ribbon 56. In this situation, some strength members 108 are crimped between cable crimp band 16 and crimp body 58 of housing member 20, while the remaining strength members are crimped between fanout crimp body 24 and fanout crimp band 26. The ribbon fibers 56 are separated and the individual fibers are then inserted into and conducted away from furcation kit 10 by furcation tubes 28, as described above. Advantageously, optical ribbon 56 may be separated into individual fibers and smaller multiple fiber ribbons. End face 66E, as shown in FIG. 7E, illustrates an embodiment that is adapted to receive individual fibers in holes 70, while receiving multiple fiber ribbon in slots 74.

While various descriptions of the present invention are described above, it is understood that the various features of the present invention can be used singly or in combination thereof. Therefore, this invention is not to be limited to the specifically preferred embodiments depicted therein.

What is claimed is:

1. A furcation device for furcating a multiple fiber cable having strength members, said furcation device comprising:

a housing member adapted to receive a fanout body, wherein the fanout body comprises a plurality of passageways and wherein each passageway receives at least one individual fiber from the multiple fiber cable;

wherein said housing member has at one end a cable crimp body, wherein at least some of the strength members from the multiple fiber cable are crimped between the cable crimp body and a first crimp band to affix the multiple fiber cable to the furcation device; and wherein the fanout body defines a fanout crimp surface, wherein at least some of the strength members from the multiple fiber cable are crimped between the fanout crimp surface and a second crimp band.

2. The furcation device of claim 1 wherein the strength members from the multiple fiber cable comprise outer strength members and inner strength members disposed inside the outer strength members, and wherein some of the outer strength members are crimped between the cable crimp body and the first crimp band.

3. The furcation device of claim 2 wherein some of the inner strength members are crimped between the fanout crimp surface and the second crimp band.

4. The furcation device of claim 1 wherein the plurality of passageways comprises at least one passageway adapted to receive one individual fiber and at least one passageway adapted to receive one multiple fiber cable.

5. The furcation device of claim 1 wherein the fanout body comprises at least one surface thereon, said surface cooperates with a corresponding surface defined on the housing members to resist relative rotational movement between the fanout body and the housing member.

6. The furcation device of claim 1 wherein a plurality of furcation tubes corresponding to the plurality of passageways on the fanout body is insertable into said passageways to conduct the at least one individual fiber to an optical apparatus.

7. The furcation device of claim 1 further comprising a top member removably connected to the housing member to hold the fanout body securely within the furcation device.

8. A furcation device for furcating a multiple fiber cable having strength members, said furcation device comprising:
   a housing member adapted to receive a fanout body, wherein the fanout body comprises a plurality of passageways and wherein each passageway receives at least one individual fiber from the multiple fiber cable;
   wherein said fanout body has an exterior fanout crimp surface, and wherein at least some of the strength members from the multiple fiber cable are crimped between the fanout crimp surface and a second crimp band to affix the multiple fiber cable to the furcation device.

9. The furcation device of claim 8 wherein at least some of the strength members from the multiple fiber cable are crimped between a cable crimp body located at one end of the housing member and a first crimp band.

10. The furcation device of claim 8 wherein the strength members from the multiple fiber cable comprise outer strength members and inner strength members disposed inside the outer strength members, and wherein some of the inner strength members are crimped between a cable crimp body located at one end of the housing member and a first crimp band.

11. The furcation device of claim 10 wherein some of the outer strength members are crimped between the fanout crimp surface and the second crimp band.

12. The furcation device of claim 8 wherein the plurality of passageways comprises at least one passageway adapted to receive one individual fiber and at least one passageway adapted to receive one multiple fiber cable.

13. The furcation device of claim 8 wherein the fanout body comprises at substantially flat surface thereon, said substantially flat surface cooperates with a corresponding at least one substantially flat surface defined on the housing member to resist relative rotational movement between the fanout body and the housing member.

14. The furcation device of claim 8 wherein a plurality of furcation tubes corresponding to the plurality of passageways on the fanout body is insertable into said passageways to conduct the at least one individual fiber to an optical apparatus.

15. The furcation device of claim 8 further comprising a top member removably connected to the housing member to hold the fanout body securely within the furcation device.

16. A furcation device for furcating a multiple fiber cable comprising:
   a housing member adapted to receive a fanout body, wherein the fanout body comprises a plurality of passageways and wherein each passageway receives at least one individual fiber from the multiple fiber cable;
   wherein the housing member further comprises a first interlocking member and a second interlocking member, wherein the first interlocking member is adapted to interlock with the second interlocking member disposed on an adjacent furcation device.

17. The furcation device of claim 16 wherein the first interlocking member is a knob disposed on the surface of the housing member.

18. The furcation device of claim 17 wherein the knob is tapered and defines a slit.

19. The furcation device of claim 17 wherein the second interlocking member is a recess hole adapted to receive the knob.

20. The furcation device of claim 18 wherein the second interlocking member is a hole adapted to receive the knob.

21. The furcation device of claim 16 wherein the first interlocking member is disposed on a top surface of the housing member and the second interlocking member is disposed on the bottom end of the housing member.

22. The furcation device of claim 16 wherein the first interlocking member is disposed on a first side surface of the housing member and the second interlocking surface is disposed on a second side surface, and wherein said first side surface is opposite to said second side surface.

23. The furcation device of claim 16 wherein the fanout body comprises at least one surface thereon, said surface cooperates with a corresponding at least one surface defined on the housing member to resist relative rotational movement between the fanout body and the housing member.

24. A furcation device for furcating a multiple fiber cable comprising:
   a housing member adapted to receive a fanout body, wherein the fanout body comprises a plurality of passageways and wherein each passageway receives at least one individual fiber from the multiple fiber cable;
   wherein the plurality of passageways comprises at least one passageway adapted to receive one individual fiber and at least one passageway adapted to receive one multiple fiber cable.

25. The furcation device of claim 24 wherein the fanout body comprises at least one surface thereon, said surface cooperates with a corresponding at least one surface defined on the housing member to resist relative rotational movement between the fanout body and the housing member.

26. The furcation device of claim 24 wherein a plurality of furcation tubes corresponding to the plurality of passageways on the fanout body is insertable into said passageways to conduct the at least one individual fiber to an optical apparatus.

27. The furcation device of claim 24 further comprises a top member removably connected to the housing member to hold the fanout body securely within the furcation device.

* * * * *

UNITED STATES PATENT AND TRADEMARK OFFICE
CERTIFICATE OF CORRECTION

PATENT NO. : 6,738,555 B1
DATED : May 18, 2004
INVENTOR(S) : Terry L. Cooke, Stuart R. Melton and Timothy S. Laws It is certified that error appears in the above-identified patent and that said Letters Patent is hereby corrected as shown below:

Column 7,
Line 20, delete "members" and substitute -- member --.
Line 61, add -- least one -- before "substantially".

Signed and Sealed this

Tenth Day of August, 2004

JON W. DUDAS
*Acting Director of the United States Patent and Trademark Office*